United States Patent
Martinez (10) Patent No.: US 11,378,868 B2
(45) Date of Patent: Jul. 5, 2022

(54) ARTICULATING LIGHT HOOD

(71) Applicant: Jeffrey Overall, Costa Mesa, CA (US)

(72) Inventor: Esteban Martinez, Fountain Valley, CA (US)

(73) Assignee: Polar Pro Filters, Inc., Costa Mesa, CA (US)

( * ) Notice: Subject to any disclaimer, the term of this patent is extended or adjusted under 35 U.S.C. 154(b) by 0 days.

(21) Appl. No.: 17/212,227

(22) Filed: Mar. 25, 2021

(65) Prior Publication Data

US 2021/0232020 A1     Jul. 29, 2021

(51) Int. Cl.
| | |
|---|---|
| *G03B 15/03* | (2021.01) |
| *F21V 21/14* | (2006.01) |
| *F21V 1/10* | (2006.01) |
| *F21V 21/06* | (2006.01) |

(52) U.S. Cl.
CPC ............. *G03B 15/03* (2013.01); *F21V 1/10* (2013.01); *F21V 21/06* (2013.01); *F21V 21/145* (2013.01); *G03B 2215/0521* (2013.01)

(58) Field of Classification Search
CPC .......... G03B 15/03; G03B 15/035; G03B 2215/0521; F21V 21/145; F21V 1/06; F21V 1/10; F21V 13/06; F21V 14/04; F21V 14/045; F21V 21/06
USPC ........................... 362/199, 359, 388
See application file for complete search history.

(56) References Cited

U.S. PATENT DOCUMENTS

| | | | |
|---|---|---|---|
| 4,165,530 A | 8/1979 | Sowden | |
| 5,016,153 A | 5/1991 | Gismondi | |
| 5,108,061 A | 4/1992 | Vlasak | |
| 6,089,724 A * | 7/2000 | Shore | F21V 33/0052 |
| | | | 362/85 |
| 7,131,753 B1 | 11/2006 | Edwards, Jr. | |
| 7,210,811 B1 | 5/2007 | Swanson | |
| 7,234,855 B2 * | 6/2007 | Chiu | G02B 6/0055 |
| | | | 362/333 |
| 7,866,850 B2 | 1/2011 | Alexander | |
| 8,277,077 B2 | 10/2012 | Georgitsis | |
| 9,182,108 B2 | 11/2015 | Hsieh | |
| 9,228,729 B2 | 1/2016 | Polick | |
| 10,088,111 B2 | 10/2018 | Hudson | |
| 10,704,745 B2 | 7/2020 | Sherry | |
| 2010/0033960 A1 * | 2/2010 | Levine | F21V 21/22 |
| | | | 362/198 |
| 2012/0243200 A1 * | 9/2012 | Sutton | G03B 15/02 |
| | | | 362/11 |
| 2014/0285993 A1 * | 9/2014 | Fisher | G03B 15/03 |
| | | | 362/6 |
| 2015/0323160 A1 * | 11/2015 | Duguid | F21V 14/045 |
| | | | 362/326 |
| 2016/0041456 A1 * | 2/2016 | Kamiya | G03B 17/04 |
| | | | 396/56 |

FOREIGN PATENT DOCUMENTS

| | | | | |
|---|---|---|---|---|
| FR | 2946158 A1 * | 12/2010 | ............. | G03B 15/03 |
| KR | 20170076897 A * | 7/2017 | | |

\* cited by examiner

*Primary Examiner* — Alan B Cariaso (57) ABSTRACT

A case for an artificial light. An articulating arm or arms attaches a hood to the case. The arm(s) allow the hood to be oriented to function as both a protective cover, shade, or stand.

3 Claims, 9 Drawing Sheets

ARTICULATING LIGHT HOOD

RELATED APPLICATIONS

This application claims priority to provisional application Ser. No. 63/147,537, filed on Feb. 9, 2021, by the present inventor, which is incorporated by reference in its entirety.

BACKGROUND

Lighting is essential to photography and videography. Artificial lighting is often needed to create the desired aesthetic or practical effects, particularly in an in-door or nighttime setting. Key lights, softboxes, reflectors, and other equipment may be used to provide and control artificial sources of lighting. Some artificial light sources, such as a key light, may be attached to a camera, or stand alone.

Artificial lights need to be safely and easily transported. Traditionally this has been done by storing artificial lights in protective cases. Protective cases are cumbersome and expensive. Installation and removal of equipment from such cases is time consuming. Mounting is another problem with artificial lighting. It may be desirable to use the same light source alternatively as a standalone light and as an attachment to a camera. Traditionally, separate stand means, such as a tripod, has been necessary to use an artificial light in a standalone manner.

As more people have begun to work remotely due to technological advances and global pandemic, video conferencing lighting has become more prevalent. Means of quickly stabilizing an LED light on a flat surface, or mounting it to a computer are needed.

SUMMARY

The present invention improves the ability to safely transport and mount an artificial light source. A hood configuration functions as a stand, protective covering, and hood capable of blocking ambient light and controlling the artificial light source.

An articulating arm operatively couples a case and a hood. The case houses a light source. The hood is configured to protectively cover the light source. The arm enables movement of the hood relative to the case. The hood serves the function of stand, allowing use of the light as a standalone artificial light, and as a hood, to block ambient light and control exposure of the light source, while protecting the artificial light source for storage and transportation while in a closed position.

DRAWING NUMERALS

10 Artificial Light
11 Diffuser
12 Hood
13 Outer Planar Surface
14 Arm
15 Inner Planar Surface
16 Case
17 Case Corners
18 LED Array
19 Charge Aperture
20 Hood Joint
22 Battery
24 Backplate
25 Monitor
26 Front Frame
28 Backdoor
30 Control Knob
32 Case Joint
34 Power Strip
35 Control Inputs
36 Bottom Insert
38 Top Insert
39 Magnets
40 Closed Position
42 Stand Position
44 Shade Position
46 Mounted Position
50 Arm Length
52 Rotation Axis

DRAWINGS DESCRIPTION

An artificial light 10 is encased in a case 16. The artificial light 10 source may be an light-emitting diode light source. The artificial light 10 may be comprised of diffuser 11, LED array 18, and battery 22 components. The artificial light 10 may be sandwiched between a front frame 26 and a backplate 24 aspects of the case 16. Screws may couple the front frame 26 and back plate 24 to a perimeter aspect of the case 16. The backplate 24 may form the back planar surface of the case 16. In this embodiment, both the artificial light 10 and the case 16 are a rectangular prism, with rounded corners 17.

The perimeter of the case may comprise a power strip 34. The power strip 34 may enable a user to turn the artificial light 10 on and off and control the intensity of the artificial light 10. A control knob 30 may be housed within the case 16. The control knob 30 may be accessible through the power strip 34, enabling a user to manually control light intensity or other light settings. A charge aperture 19 may enable insertion of a power source to charge the battery 22, provide an electrical power source, or otherwise provide an energy source to the artificial light 10.

An arm 14 may operatively couple the case 16 and a hood 12. In the alternative embodiments the hood 12 is coupled at one end of the length 50 of the arm 14 and the case is coupled at the opposing end of the length 50 of the arm 14. The arm 14 may couple with the case 16 at a case joint 32.

The case joint 32 may enable one degree of freedom, with rotation along a plane transverse to the planar surface of the artificial light 10. A hood joint 20 may comprise the opposing end of the arm 14. The hood joint 20 may operatively couple a hood 12. The hood joint 20 may enable movement of the hood 12 relative to arm 14, such as rotation of the hood 12 around an axis 52 extending perpendicular from the length of the arm 14.

Figure 1:
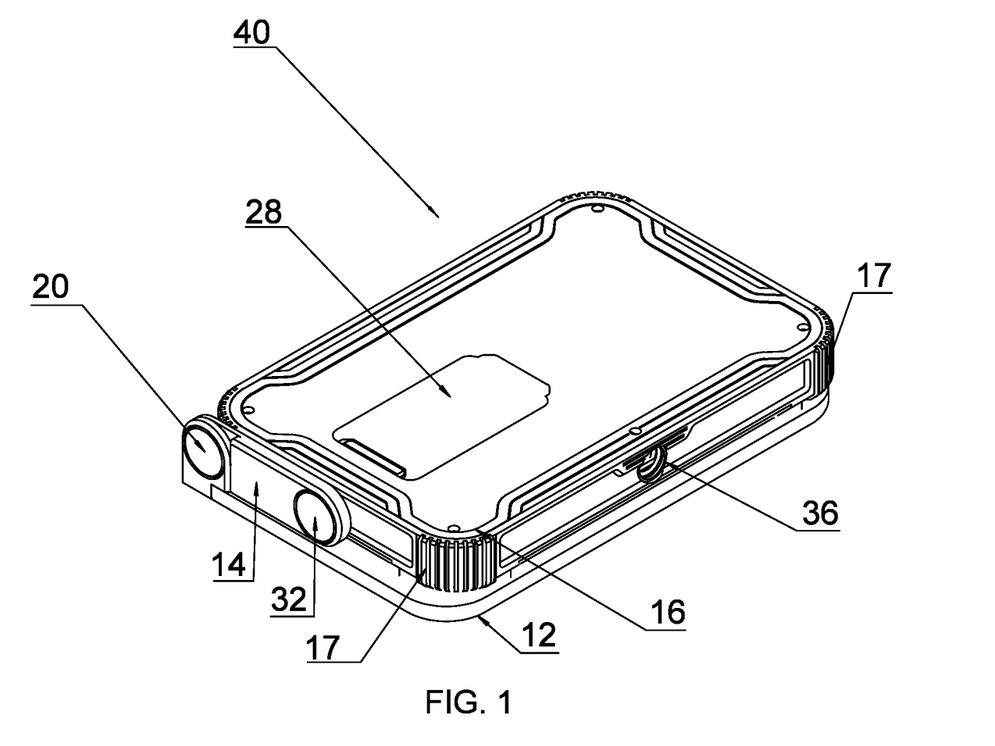
FIG. 1 is a back left perspective view of an articulating light hood in a closed position.
Figure 2:
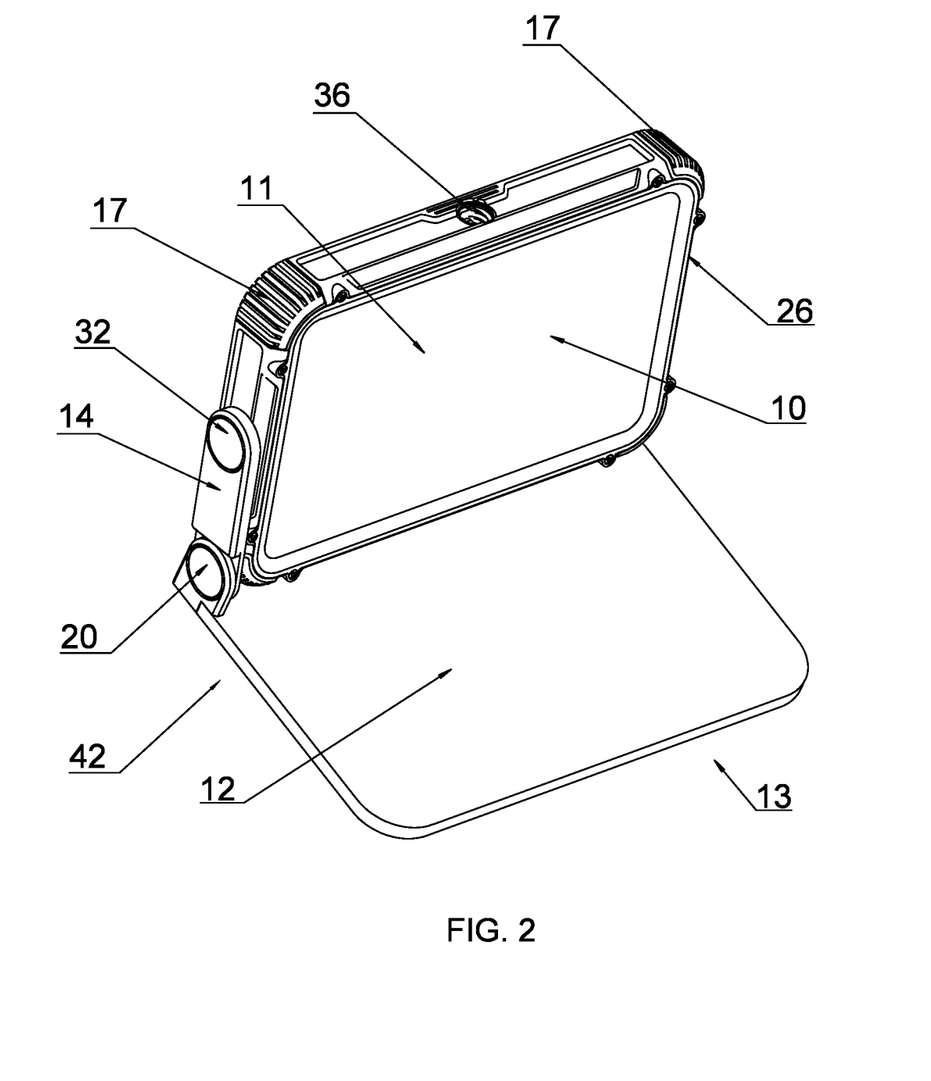
FIG. 2 is a top front left perspective view of an articulating light hood in an open position.
Figure 3:
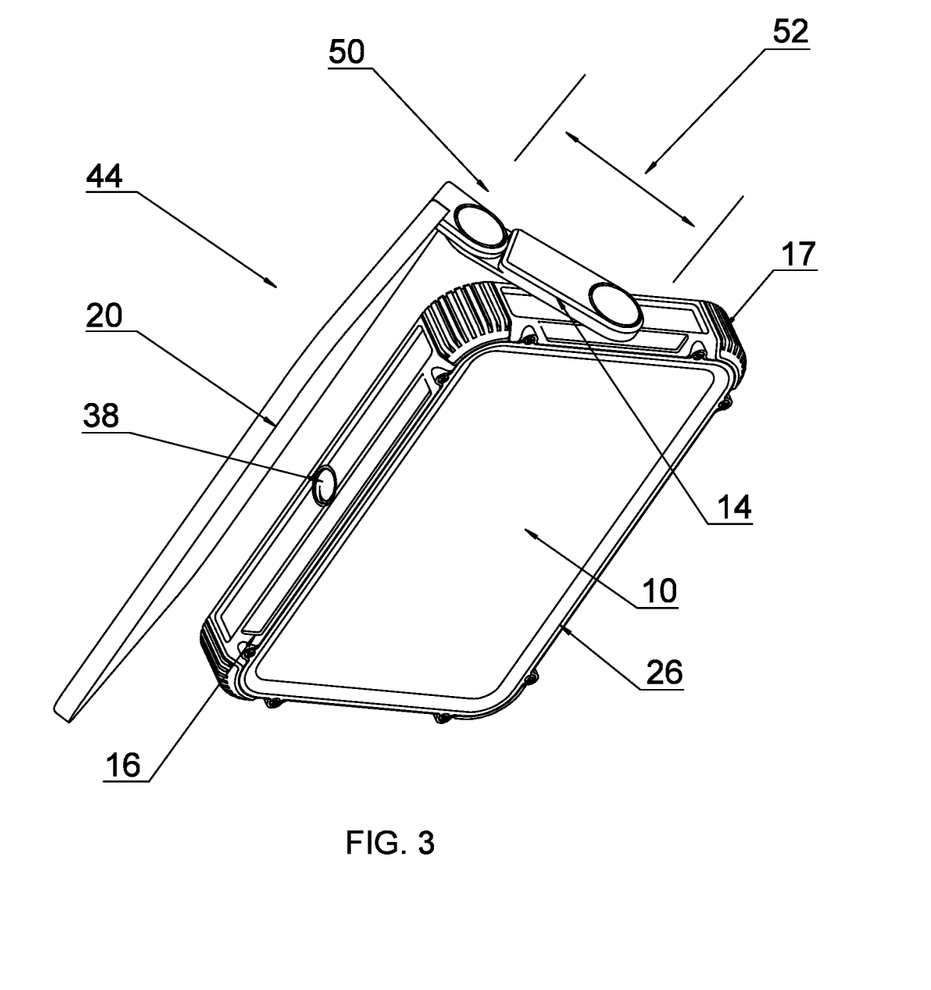
FIG. 3 is a right and top and front view of an articulating light hood in an open position.
Figure 4:
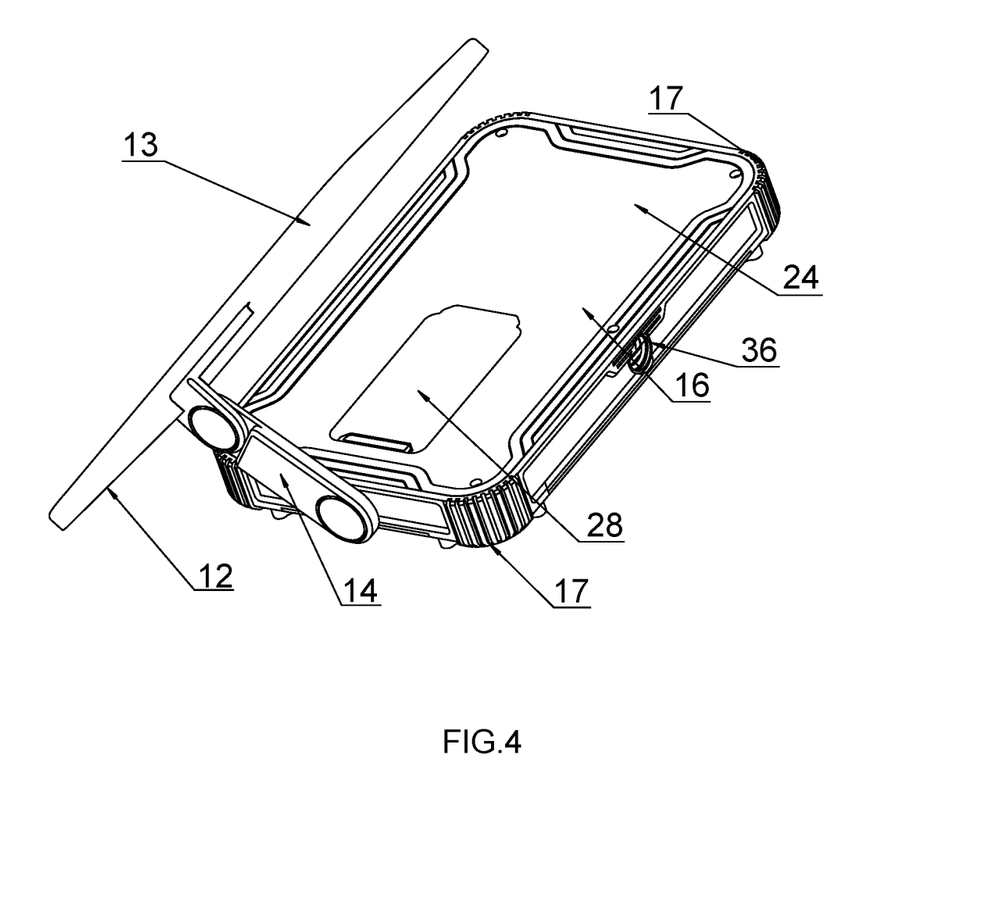
FIG. 4 is a right and bottom and back view of an articulating light hood in an open position.
Figure 5:
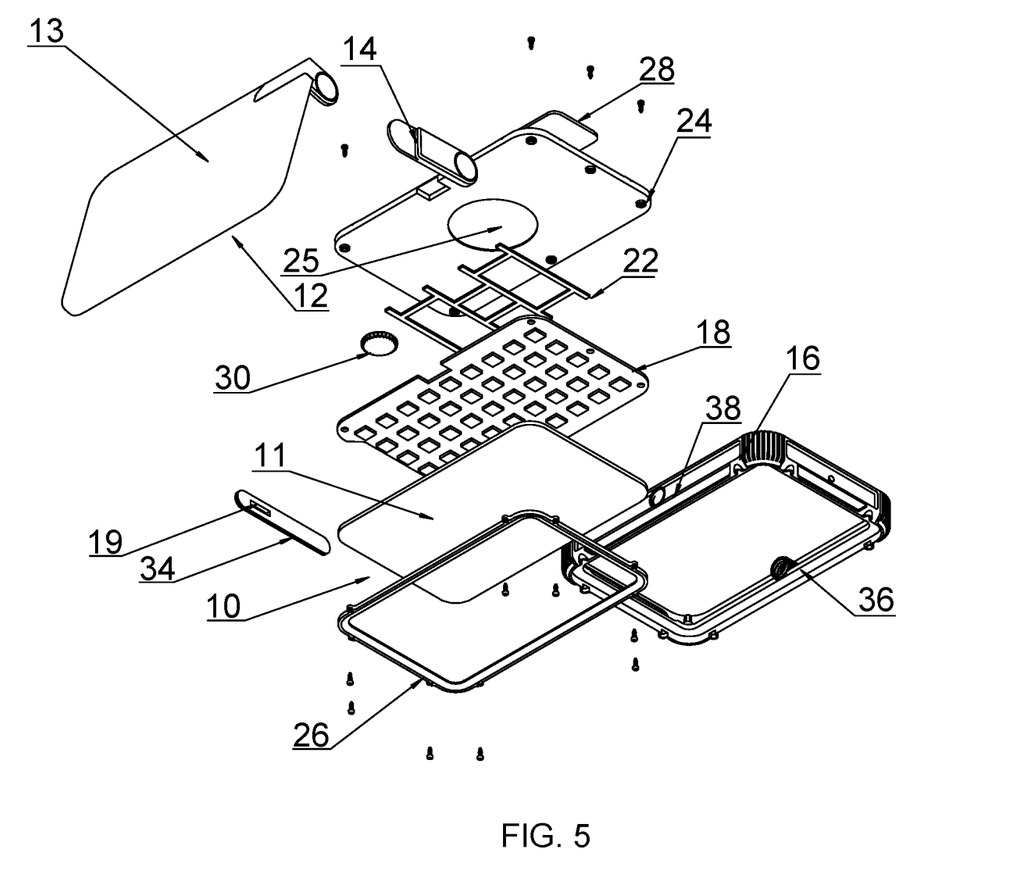
FIG. 5 is an exploded view of an articulating light hood.
Figure 6:
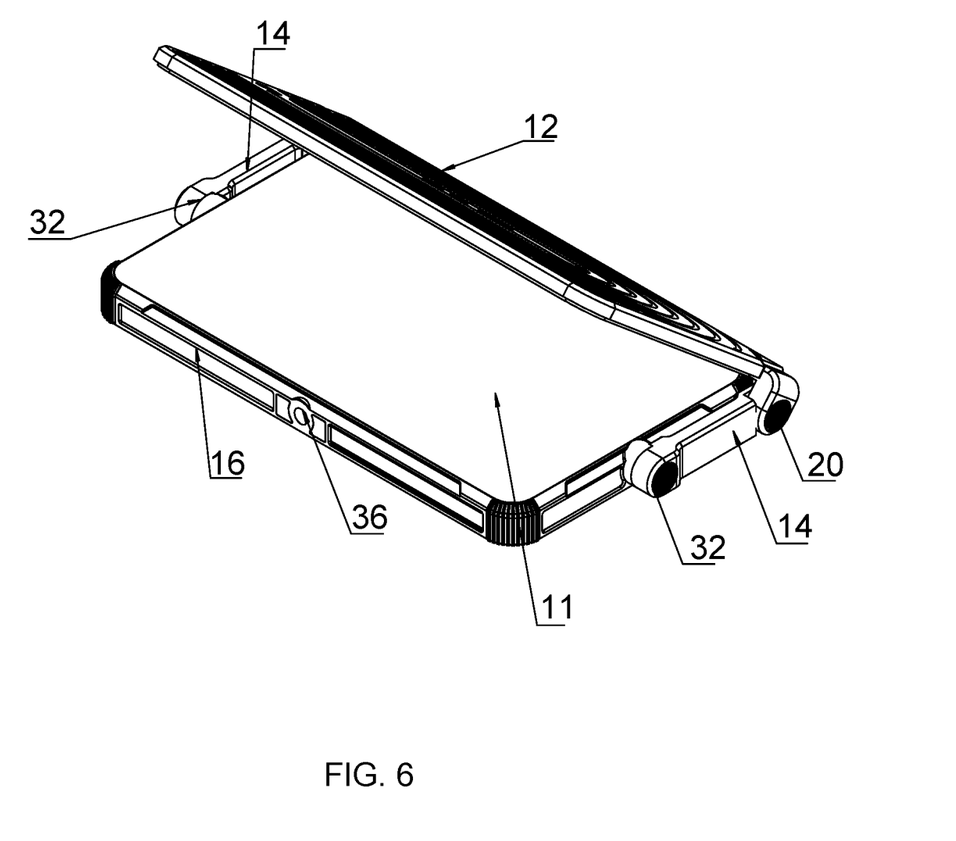
FIG. 6 is a front right top perspective view of a two-arm embodiment of an articulating light hood in an open position.

The hood joint 20 may enable the hood 12 to move into a closed position 40 (see FIG. 1). In this orientation, the planar surfaces (13, 15) of the hood 12 are roughly parallel to the length of the arm 14. The hood joint 20 may also enable the hood 12 to rotate away from the arm (see FIG. 2-4). Aspects of both the arm 14 and hood 12 may comprise the hood joint 20. These aspects may abut or otherwise be oriented to create friction. The friction may enable the hood 12 to be secured in multiple positions relative to the arm 14. Similarly, friction created by aspects of the arm 14 and case 16 may create fiction enabling the arm 14 to be secured in multiple positions relative to the case 16. Alternative embodiments may include an additional mechanism or mechanisms allowing a user to lock the joints (20, 32) in specific orientations.

A thermoplastic, such as Delrin®, and brass may comprise the interfacing surfaces of the hood 12 and arm 14, and the case 16 and arm 14 comprising the joints (20, 32). Grease or other lubricant may also be used between interfacing surfaces of one or both joints (20, 32).

The case 16 and hood 12 may be comprised of aluminum, glass filled nylon, plastic or other material with the structural integrity to protect the artificial light 10. The case corners 17 may be comprised of thermoplastic elastomer or other material providing shock absorption from impact to the case 16. A bottom insert 36 and top insert 38 may be positioned on opposing sides of the case. The bottom 36 and top insert 38 may each be threaded sockets configured to couple with a ¼"-20 screw.

Joint friction may secure the hood 12 in a closed position 40. The arm 14 may be aligned parallel to the side of the case 16 (see FIG. 1) and the hood 12 rotated so the inner planar surface 15 abuts the front frame 26. The outer planar surface 13 covers the artificial light 10. The diffuser 11 surface is covered and protected from contact by an outer surface. Covered may herein mean the prevention of contact with the surface of an object outside the case 16. The closed position 40 may not result in the prevention of exposure of the artificial light to liquid or gas.

Figure 8:
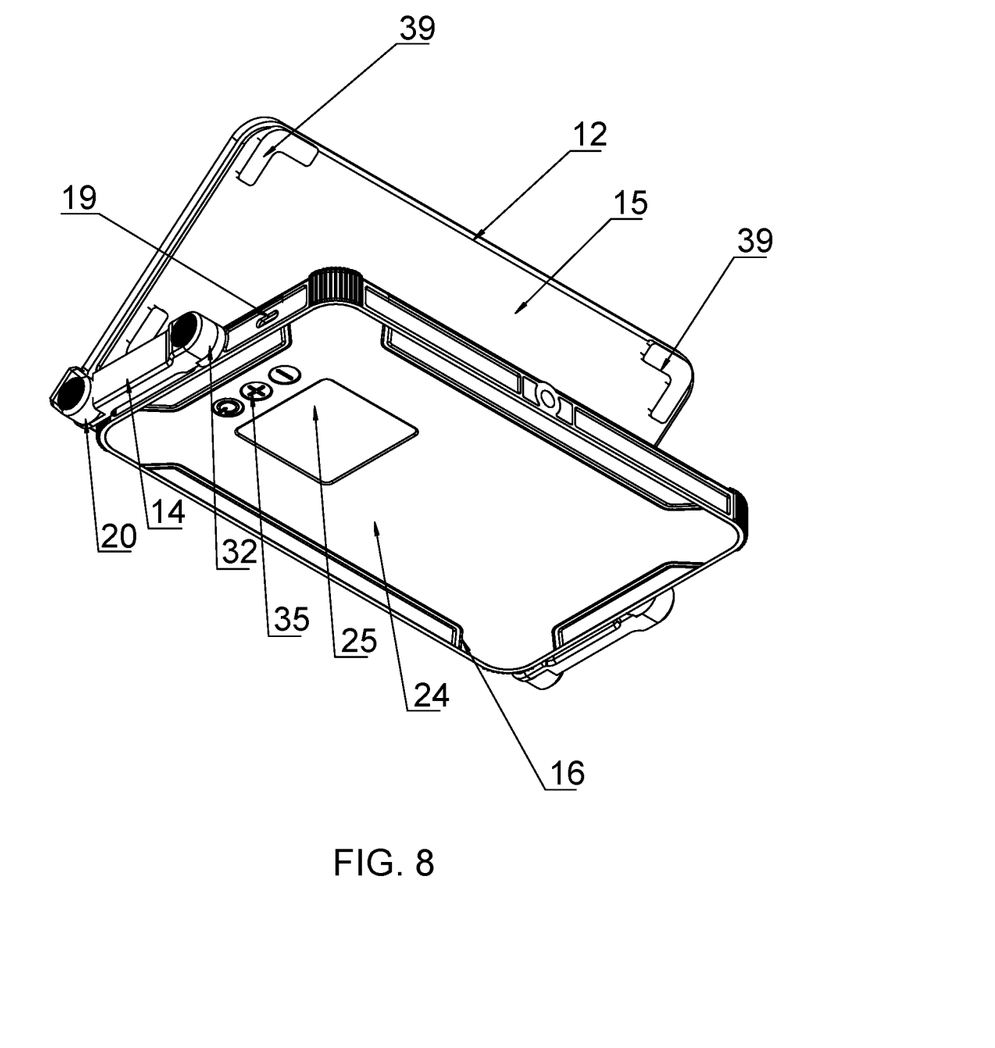
FIG. 8 is a bottom left perspective view of the two-arm embodiment of an articulating light hood in an open position.

Additional components may secure the hood in the closed position 40. Magnets 39 may be embedded within or otherwise coupled with the hood 12 and case 16, the magnetic force pulling the hood 12 towards the case 16. FIG. 8 depicts magnets 39 attached at the corners of the inner planar surface of the hood 12. Snap-hooks, snap-fasteners, ratchet fasteners, or other detachable coupling systems may be used to better secure a closed position 40.

Similarly, joint friction may enable the creation of a plurality of open positions, wherein the hood 14 is moved out of the closed position 40, away from the diffuser 11 surface of the artificial light 10. A stand position 42 is one such open position. A planar surface of the hood 12 is placed on a substantially flat surface. The case 16 may be rotated around the degree of freedom created by the case joint(s) 32. In a stand position 42 the hood 12 and arm(s) support and stabilize the case 16, enabling the artificial light 10 to be directed in a fixed direction or adjusted via the case joint(s) 32. Joint friction stabilizes the case against gravity and movement due to inadvertent force. Magnets 39 may enhance the stability of a stand position 42 when hood is placed on a surface with ferromagnetic quality.

Similarly, joint friction may enable creation of a shade position 44. The bottom insert 36 may couple with an auxiliary device, such as a camera. The arm 14 and hood 12 may be adjusted to block ambient light or direct light emitted by the diffuser 11.

A monitor 25 may be positioned on the back of the artificial light 10. The monitor 25 may display the battery life, RGB, and other light settings. The monitor 25 may be an LCD screen, enabling a input of commands to control light settings. A backdoor 28 may protectively cover the monitor 25. The backdoor 28 may retract into the case, enabling exposure of the monitor 25.

Figure 7A:
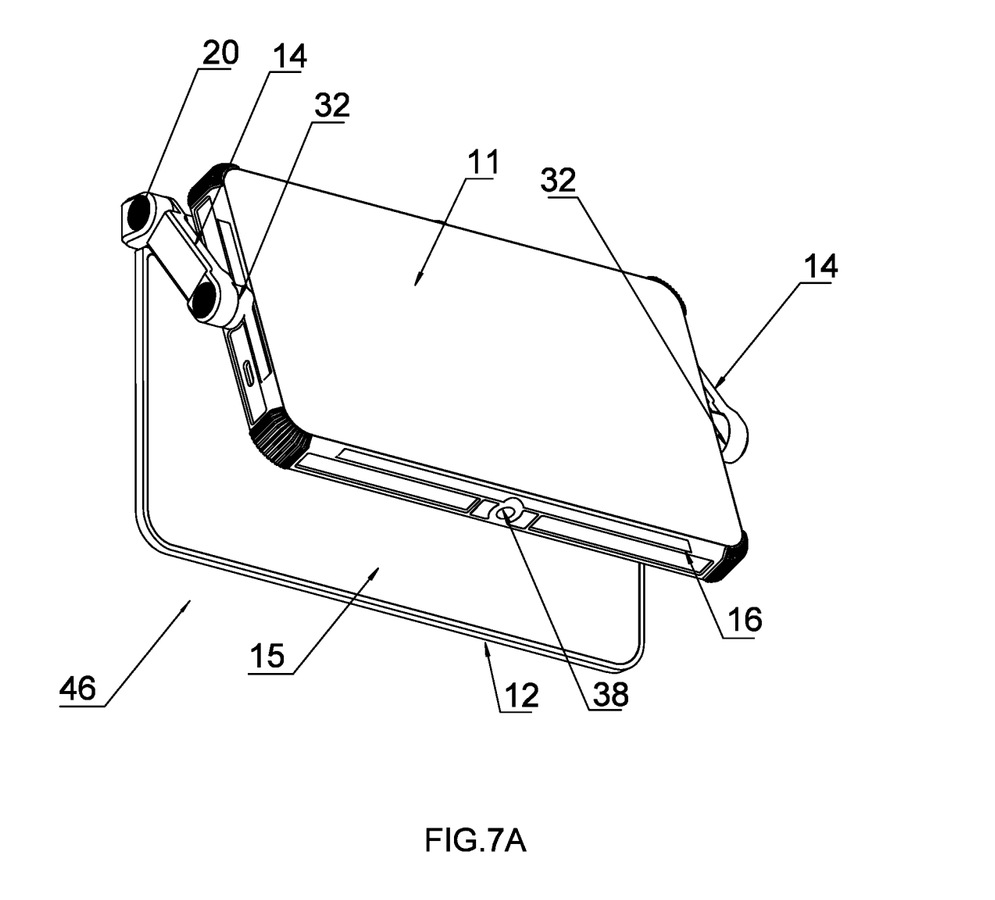
FIG. 7A is a front left side perspective view of the two-arm embodiment of an articulating light hood in an open position.

Multiple arms 14 may be used to operatively couple the hood 12 with the case 16. Multiple arms 14 may improve coupling strength and stability. Multiple hood joints 20 may enable increased friction, providing greater stability of the hood 14 in a closed 40 and open positions. The arms 14 may move in unison. Multiple arms 14 may enable the Articulating Light Hood in a mounted position 46. In a mounted position 46, the hood 14 is rotated behind the LED array 18 (see FIGS. 7A-B). The mounted position 46. The mounted position 46 may be used to couple the Articulating Light Hood to a computer screen, the planar surface of the hood 14 abutting a back surface of the monitor 25 and the arms 14 and hood joints 20 hooking over the top of the monitor.

Figure 7B:
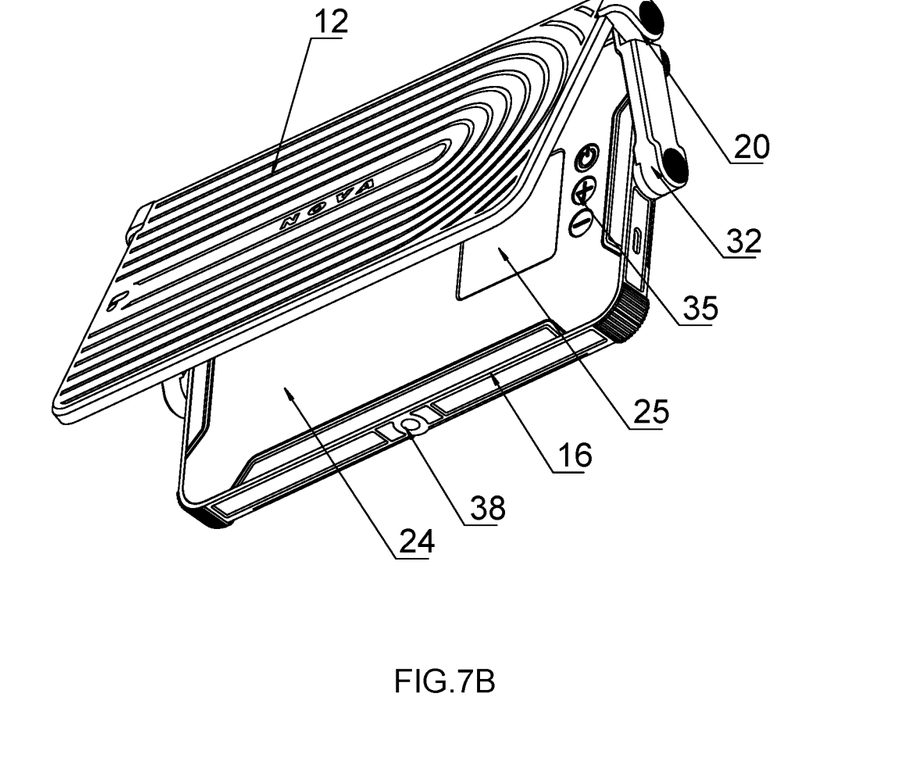
FIG. 7B is a back left side perspective view of the two-arm embodiment of an articulating light hood in an open position.

Control inputs 35 may be placed on the back of the case (see FIG. 7B). The control inputs 35 may work in tandem with a power strip 34, or replace it.

The foregoing disclosure is intended to be illustrative and not limiting the scope of the invention. Merely exemplary embodiments and methods related to the invention are discussed and described. As will be understood by those familiar to the art, the disclosed subject matter may be embodied in other forms or methods without departing from the essence of the invention.

I claim:

1. A artificial light stand, comprising:
   a. an artificial light protectively coupled with a case;
   b. the case comprising camera coupling means, whereby the case may couple with an auxiliary device;
   c. a hood;
   d. at least one arm;
   e. at least one hood joint, whereby the arm couples with the hood;
   f. at least one case joint, whereby the arm couples with the case;
   g. the at least one hood joint and the at least one case joint enabling movement of the hood relative to the case, whereby a closed position, and at least one open position may be created;
   h. the arm enabling movement of the hood into a stand position;
   i. the hood comprising at least one planar surface capable of stably mounting the artificial light in a stand position.

2. An artificial light, comprising:
   a. a hood;
   b. a case, the case housing an artificial light;
   c. a plurality of arms operatively coupling the case and the hood;
   d. the plurality of arms enabling movement of the hood relative to the case, and the plurality of arms enabling movement of the case relative to the hood;
   e. the plurality of arms being configured to move the hood into a closed position and a plurality of open positions;

f. the plurality of arms being capable of moving the hood to the closed position;
g. the plurality of arms being capable of moving the hood into the plurality of open positions;
h. the hood comprising at least one planar surface capable of stably mounting the artificial light in a stand position.

3. An artificial light, comprising:
a. a hood;
b. a case, the case housing an artificial light,
c. an arm operatively coupling the case and the hood;
d. the arm enabling movement of the hood relative to the case, and the arm enabling movement of the case relative to the hood;
e. the arm being configured to move the hood into a closed position and a plurality of open positions;
f. the arm being capable of moving the hood into a plurality of open positions;
g. the hood comprising at least one planar surface capable of stably mounting the artificial light in a stand position.

* * * * *